United States Patent [19]

Knopf

[11] Patent Number: 4,805,801
[45] Date of Patent: Feb. 21, 1989

[54] BEVERAGE FILTER DISPENSER

[76] Inventor: Edward J. Knopf, 1038 Terrace Wood Ct., Ballwin, Mo. 63011

[21] Appl. No.: 118,007

[22] Filed: Nov. 9, 1987

[51] Int. Cl.$^4$ .................. B23Q 7/04; B65H 1/08
[52] U.S. Cl. .................... 221/210; 221/59; 221/255; 221/312 C; 294/1.1; 206/556
[58] Field of Search ............ 221/37, 45, 59, 60, 221/63, 210, 255, 312 R, 312 C, 279; 294/1.1; 267/148; 206/556

[56] References Cited

U.S. PATENT DOCUMENTS

| | | | |
|---|---|---|---|
| 1,205,892 | 11/1916 | Hecht | 221/210 X |
| 1,730,126 | 10/1929 | Dailey | 221/210 X |
| 2,059,546 | 11/1936 | Brandenburg | 221/220 |
| 2,284,071 | 5/1942 | Sayles | 221/37 |
| 2,638,211 | 5/1953 | Spurr | 221/60 X |
| 2,729,528 | 1/1956 | Bennett | 221/312 R |
| 3,094,323 | 6/1963 | Catania | 221/210 X |
| 3,248,006 | 4/1966 | Lowery et al. | 221/210 |
| 3,953,090 | 4/1976 | Fuchs | 206/556 X |
| 4,093,297 | 6/1978 | Reiber | 294/131 X |
| 4,214,673 | 7/1980 | Heath et al. | 221/259 |
| 4,266,665 | 5/1981 | Nelson | 221/63 X |
| 4,574,952 | 3/1986 | Masui | 221/37 X |
| 4,653,666 | 3/1987 | Mertens | 221/59 X |
| 4,674,635 | 6/1987 | Huldin et al. | 221/47 X |
| 4,676,396 | 6/1987 | Mamolou | 294/1.1 X |
| 4,739,902 | 4/1988 | Joslyn et al. | 221/210 |

*Primary Examiner*—Joseph J. Rolla
*Assistant Examiner*—Gregory L. Huson
*Attorney, Agent, or Firm*—Paul M. Denk

[57] ABSTRACT

Fluted coffee or other beverage filters, generally formed of paper, or paperboard, are so stacked in containers in which they are sold that it is not easy to lift off and remove a single filter paper for application. The practice has been to transfer the filters to a dispenser therefor, but generally such dispensers are fabricated of a polymer material, are reasonably expensive, and are not for disposable usage, or ease of application. Herein, the container and beverage filter dispenser of this invention may be solid and marketed with a supply of filters, and thrown away after application and usage. In addition, the invention contemplates a blank from which the container, and spring for biasing the filters upwardly within the container, may be fabricated.

8 Claims, 3 Drawing Sheets

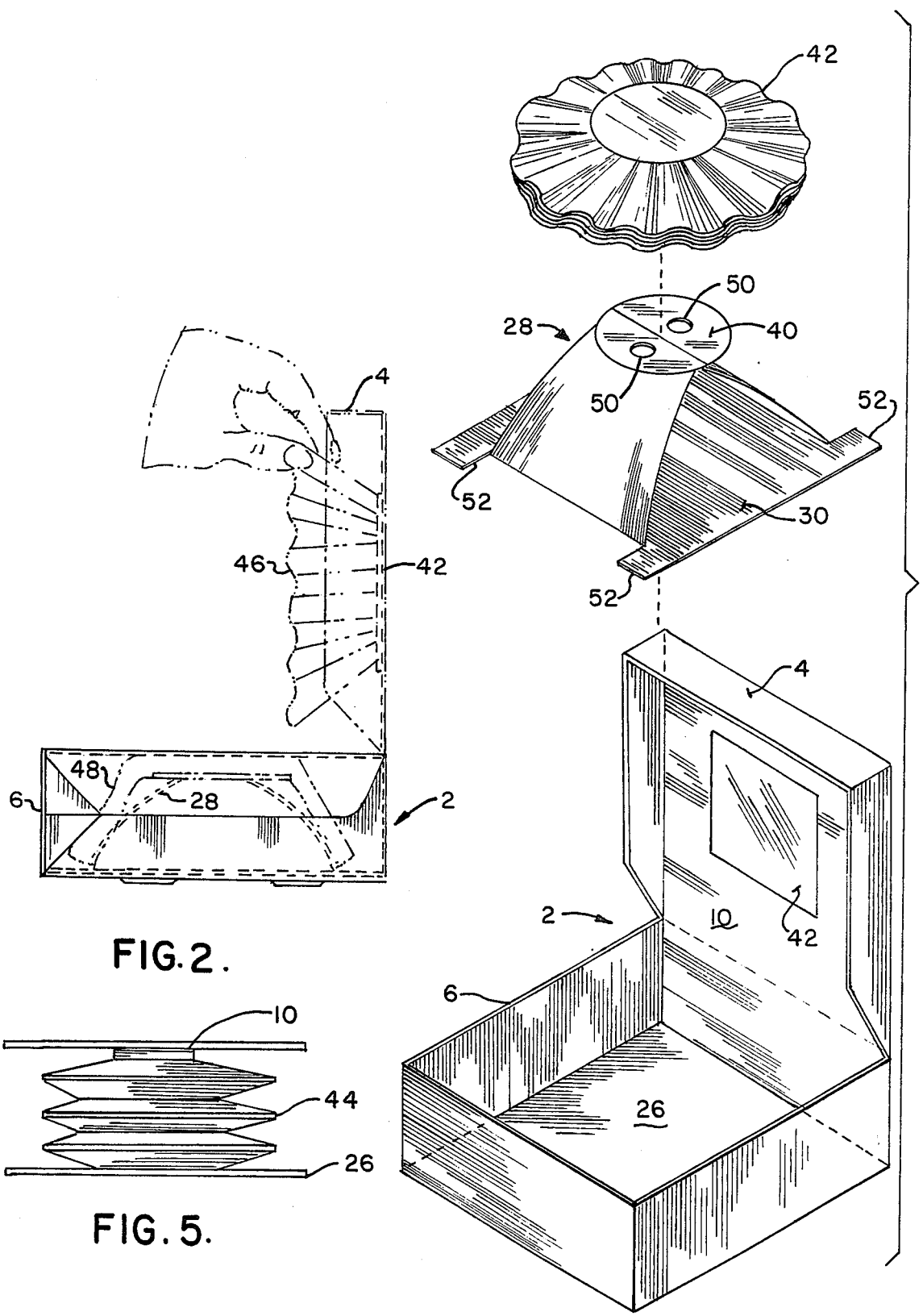

BEVERAGE FILTER DISPENSER

BACKGROUND OF THE INVENTION

This invention, in one of its aspects, pertains to containers for stacks of nested, dished, concaved, filter papers with flat bottom walls, and conical side walls. When such flat bottomed filter papers, particularly fluted coffee filter papers, are so stacked, it is difficult to achieve a lift off of individual filters, from the stack of filter papers. To achieve a separation of them is an undesirable task, and often times time consuming.

Because of the difficulty of withdrawing coffee and similar filters from the box in which they are sold, the practice has been to transfer the filters to dispensers therefor. Such type filters are shown and illustrated in earlier U.S. Pat. Nos. 4,121,726, 4,214,673, and 4,339,057.

U.S. Pat. No. 4,121,726, shows an apparatus for dispensing paper articles. This device is rather complex in structure, as can be seen, but what is significant about this particular patent disclosure, as can be seen, is that it is applicable for dispensing coffee filters. The device of this prior invention, though, is rather complex in structure, as can be noted, and concerns the movement of the engaging means into contact with the interior of the next filter, and then a lifting of the cover means upwardly for removal of that next filter. Other than the fact that it is useful for the removal of coffee filters, it has not structural similarity to this current invention.

The U.S. Pat. No. 4,214,673, shows a cup-shaped coffee filter dispenser. This particular device is pertinent from the standpoint that it does incorporate a contact member, for attachment with the interior surface of the next top coffee filter within the stack, and having a high frictional surface provided thereon, for contacting and holding of that next filter paper when pressed against, and to achieve its removal. Apparently that high friction surface is formed of an abrasive, such as a coarse sand paper.

The U.S. Pat. No. 4,339,057, shows another form of cranking device for dispensing filter papers, particularly those that are nested, such as coffee filters. This particular patented device is not too unlike that as just previously described, with respect to the Hausam patented device.

Another dispenser means which might be usable for dispensing purposes is that which is described in U.S. Pat. No. 4,269,324. That particular dispenser, as shown, is for application and usage for a paper-like container, which in this particular instance, once again, comprises dispenser means for filters for use with a coffee maker. This device, once again, is rather complex of structure, including a rotational means or actuating shaft, having an arm affixed thereto. The arm is formed of a resilient leaf spring extension, and which has a burr means provided at its tip, for frictionally engaging the sidewall of the lower most filter, positively gripping the same, and then apparently rotating it downwardly into a dispenser opening, as during application and manipulation of its crank arm.

An examination of this previously explained dispenser shows that structurally they are quite complex, and therefore somewhat costly of manufacture.

Other earlier patents showing dispensing means includes the U.S. Pat. No. 4,401,233, that shows a dispenser for sheets of paper and the like. The paper, in this particular instance, comprises wrapped sheets that are used in the curling of hair. This device is apparently for use by the beautician, and is not too unlike some of the earlier patented devices previously explained, where a spring arm has a pad means that incorporates apparently adhesive characteristics, for attachment with the top sheet stored in the receptacle.

Another U.S. Pat. No. 4,417,670, shows a related device for dispensing of tissue paper and sheet material. This particular device is not too unlike those dispensers as previously described as for application in the dispensing of tissue sheet, as through the use of a spring biased arm. As can be seen, there is a support post having a pickup head, and which incorporates means provided for grasping the next tissue paper to be dispensed.

Other U.S. patents showing dispensing devices include the U.S. Pat. No. 317,234, which is an adhesive paper lifter, for dispensing one sheet or layer of paper after another. The U.S. Pat. No. 1,205,892, shows a container for loose sheets. The loose sheets of paper in this particular instance comprising cigarette papers, are arranged within its container, and the individual sheets are raised by their adherence with a coating of wax for individual dispensing and usage. The U.S. Pat. No. 1,730,126, shows a means for aseptically storing and dispensing surgical napkins. The U.S. Pat. No. 2,269,525, indicates a carbon paper container. In this device, the cover section contains an inwardly bent flap, having a spot of adhesive substance located thereon, and which contacts the next sheet of carbon paper within the box, raising it, as when the lid is opened. The U.S. Pat. No. 2,885,112, shows another form of sheet paper dispensing device. In this particular instance, the variety of sheets are stacked within the container, as shown, and are raised upwardly by means of an adhesive wafer that is applied upon the tongue depression, as noted in this disclosure. The U.S. Pat. No. 3,094,323, shows another form of spring biased member which has a covering of pressure sensitive adhesive material applied thereon, for biasing against the uppermost sheet of paper, and for dispensing of the same. The spring biasing means of this disclosure is a U-shaped member, applied in conjunction with the upper end closure of its container, rather than having the spring biasing means that pushes a stack of papers upwardly, as explained in the current invention. Finally, the U.S. Pat. No. 3,248,006, shows another form of dispenser, for dispensing sheet tissue, and in this particular instance, simply incorporates a coil spring arm, having an adhesive provided upon the lower surface of its pickup head, with the user then simply depressing the head into contact with the uppermost sheet, for adherence of that single sheet to the arm.

In accordance with this invention, the container in which the filters are packaged and marketed is also a filter dispenser, but the dispenser is so simplified in construction, generally fabricated from a blank of paperboard material, that it is of very little cost, with the dispenser means being integrated into the box of the container in which the papers are marketed.

SUMMARY OF THE INVENTION

As previously indicated, this invention contemplates the formation of a container from a blank of paperboard material. It is primarily used for the marketing of flat bottomed or perhaps slightly arcuate bottomed filter papers, a supply of the same being provided within the formed container. The container is capable of dispensing such filter papers. The container is in the form of a box with a closely fitting lid, and with spring means adapted for proximity fitting or attachment interiorly of the bottom of the box, and useful for biasing a supply of filters towards its lid, and more specifically its internal surface thereof. This biasing action urges the filter papers in the box against the underside of the lid. A pad of adhesive material is affixed to the lid underside, with the adhesive pad having a sticky surface so that when the top filter is contacted against it, as by an urging of the biasing means, or spring means, of the stack of stored filter papers upwardly, that individual filter is lifted by the lid when the lid is raised or pivoted open, for dispensing that individual beverage filter for ready application and usage.

BRIEF DESCRIPTION OF THE DRAWINGS

In referring to the drawings,

FIG. 1 is an exploded view of the preferred embodiment of the beverage filter dispenser and container of this invention;

FIG. 2 is a side view, partially in phantom, showing the invention in application;

FIG. 5 is an elevational view of a type of the biasing means that may be used in conjunction with this invention.

DESCRIPTION OF THE PREFERRED EMBODIMENT

Figure 3:
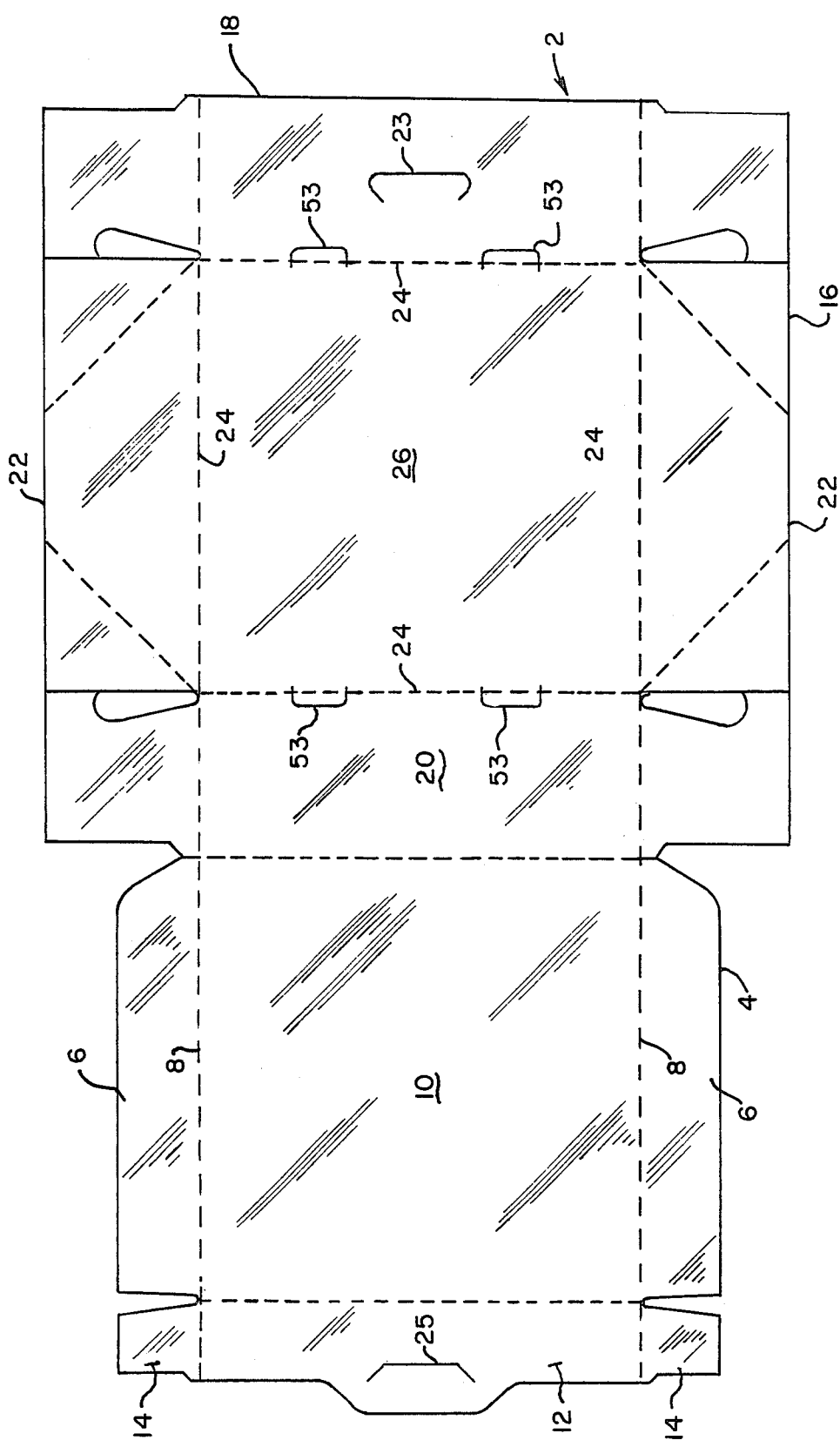
FIG. 3 illustrates, in its unfolded form, one form of a blank for the container.

In referring to the drawings, and in particular FIG. 3, it can be seen that the container 2 is of an ordinary box like configuration, and in which the fluted coffee filters used in conjunction with this invention are sold. Its lid 4 is formed by folding side flaps 6 upwardly along their fold lines 8 so that the panel 10 forms the interior or inside of the lid structure. When the front flap 12 is folded upwardly, the tabs 14 can be inserted, glued, taped, or otherwise secured to the lid sidewalls 6, to form an integral lid structure. The bottom 16 of the box structure is similarly formed, as when its front and rear panels, 18 and 20, respectively, and the side panels 22, are folded upwardly along their respective fold lines, as shown along the fold or score lines 24. The result is a box structure 2 that forms the container such as shown in FIG. 1 of the drawings. Locking means 23 and 25 may be provided for engagement of the box lid with its base or bottom 16.

The invention herein contemplates the structure of a box in which not only can the filters be marketed, but also from which the filters can be easily dispensed, as required. Having thus described the structure of the box, in the blank form, an explanation of the application of the box for use for dispensing of filters is herein made. The dispensing embodiment of the invention includes the combination of a spring or biasing means, with an adhesive pad applied thereto. Reference is made to the spring means, as shown in its blank form in FIG. 4. Any type of biasing means could be used in conjunction with the subject matter of this invention, and principally for providing an upward urging or lift to the supply of filters, in order to move the uppermost filter of the stack into proximity with its adhering means, which as to be subsequently described, acts in cooperation with the interior of the lid, for lifting off the next filter for ready use and application. However, within the spirit of this invention, which is to provide a throw-away type of dispensing box, the spring or biasing means itself must be simple of manufacture, easy of application, and generally be inexpensively produced, in order to be discardable. In fact, it is preferred that the spring means of this invention also be fabricated of paperboard stock.

Figure 4:
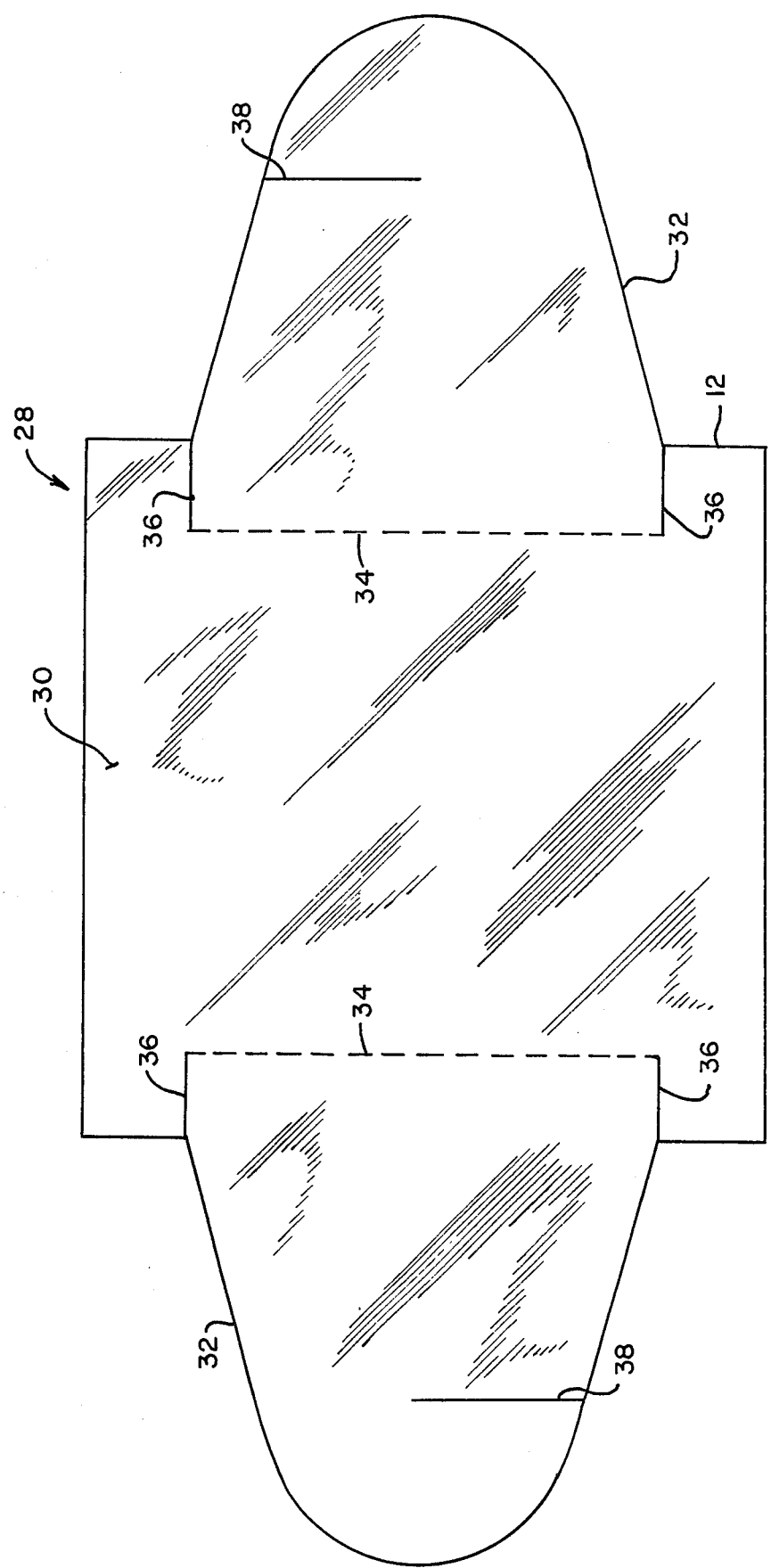
FIG. 4 indicates, in its unfolded form, the blank shape of a preferred spring or biasing means for use in application within the container of this invention.

In the preferred embodiment the biasing means for the device is formed of the leaf spring type, as shown at 28 in FIG. 2, and also being shown in the blank form, in FIG. 4. Much like the box structure of this invention, this spring means is formed by folding and bending of moderately heavy but resilient paperboard stock. In its structure, the spring means incorporates a base plate like member 30, having resilient ears 32 formed to either side, and being connected along fold lines 34 inwardly of the edges of the underlying base plate 30, as can be noted. Cut lines are provided into the paperboard material, as at 36, in order that the resilient ears, when folded, have their lower margins arranged generally inwardly from the outer edges of the base plate 30. The reason for this is to provide some clearance for the lower edges of the inverted stack of beverage filters, as they are initially stored and supplied to the container, and preparation for shipment and marketing. In its assembly, the resilient ears 32 are folded upwardly along their fold lines 34, and they are bent towards each other and interlocked by inserting each ear into the respective slit, as at 38, provided within each ear, in order to provide for interlocking through insertion of each ear with respect to each other, when fabricated into the spring like means. When the ears are interlocked together, the adjacent end portions of the ears beyond the slit's end form a substantially, but resilient flat surface, generally as shown at 40, as disclosed in FIG. 1, for the purpose of providing a supporting surface upon which the generally flattened bottoms, yet inverted, of the filters, as shown at 42, may rest.

In referring once again to FIG. 4, it can be seen that after the ears 32 are bent to form the spring means 28, as shown in FIG. 1, the base plate 30 remains generally in a plainer configuration, and which is disposed for convenient and snug positioning within and against the bottom 26 of the formed container or box. This base plate insures that the spring means will stand in its proper position when inserted within the box, and when readied for usage.

The second component useful for the application and functioning of the dispensing means of this invention includes the application of an adhering means, such as an adhesive pad 42, with said pad being bonded to the interior or inside surface of the top wall 10, of the lid structure 4. When attached to the interior of the lid 4, the adhesive pad 42 provides a sticky outer surface. A desirable material for use for this means would be a two sided or double sided piece of pressure sensitive tape. See FIG. 1.

In addition to the foregoing, and as an alternative, it is just as likely that other forms of biasing means could be used for attaining the same purpose as that achieved from the paperboard spring like means 28, as previously described. For example, as disclosed in FIG. 5, another such spring means would be a simple bend plate type of spring means 44, such as structured in the form of a bellows. In this configuration, the spring means 44 would rest upon the bottom of the base 26, of the formed box, to provide a type of spring means that operates similarly to that as previously explained with respect to the paperboard formed spring 28, as earlier described.

Having described the various components of this invention, and the ease, particularly, that they can be assembled from paperboard stock, or other inexpensive materials, the invention's use in the storing, marketing, and dispensing of beverage filters, and particularly coffee filters, can now be explained. FIGS. 1 and 2 illustrate such usage. FIG. 1 shows how the components of the invention are assembled. Spring means 28 is lowered onto the bottom 26 of the box 2. This obviously is done after the spring means has been assembled from its blank configuration, as shown in FIG. 4, into is folded and usable disposition as shown in FIG. 1. Then, a stack of filters 42 are inserted therein, in their inverted disposition, as shown, and carried upon the flat top surface 40 formed of the identified spring means. Then, when the lid is closed, the filters 42 are then ready for shipment. In use, and in referring to FIG. 2, it is to be understood that the spring means 28 urges the filters upwardly against the underside 10 of the box lid 4. This presses the uppermost filter against the sticky surface of the adhesive pad 42. When the lid 4 is then raised as shown in FIG. 2, the top filter 46 then adheres to the adhesive pad 42 of the lid. This is achieved because the adhesive pad adheres to that uppermost filter, and can easily lift it off and separates it from the remaining stack of filters, as at 48, yet located within the bottom 2 of the box. When the foregoing is achieved, that single adhering filter 46 can thus be simply removed from the adhesive pad 42, and readied for usage. Then, each time the lid is again closed, and then pivoted into its raised or opened position, the next top filter from the stack will easily be lifted and carried by the adhesive pad, and ready for dispensing.

It will be appreciated that the subject matter of this invention provides a container in which filters can be marketed, and from which filters can be easily dispensed by the homemaker, restaurant worker, or the like. Variations and modifications of the invention will obviously occur to those skilled in the art upon reviewing the subject matter of this invention. As an example, while it is desirable to have an adhesive material on the top of the spring means, such as that shown at 50, in order to prevent the stack of filters from falling off of the spring means should the box be tipped, such is not totally necessary to the usage and application of this invention. In addition, it may be desirable to bond or otherwise secure the spring base plate to the bottom of the box. A practical method would be to insert the extending tips 52 of the base into slots 53 in the bottom walls, or at the junction between the front and back flaps 18 and 20 with the bottom wall 26, in order to retain the spring means in place. Or, it can be simply glued into position. On the other hand, no adhesion whatsoever of the spring means to the box bottom is necessary to the operations of this invention. It should also be appreciated that whereas the hinged lid 4 is shown formed integrally with the box bottom segment, a separate lid could equally just as effectively be used. Furthermore, in addition to the double sided or double adhesive tape 42, a non-hardening plastic, which remains tacky, could be applied in its place. Such modifications or variations are deemed to be within the scope of this invention. The description of the perferred embodiment set forth herein is done so for illustrative purposes only.

I claim:

1. A container for marketing flat bottomed or related beverage filter papers, of the type having a central cavity therein, said container being of the type for use for holding a plurality of beverage filter papers, and which container also being capable of dispensing said beverage filter papers, one at a time, comprising a box adapted to hold a supply of the filters, said filters being arranged in the container in an inverted position such that said flat bottom is directed upwardly, a closely fitting generally planar lid therefor, biasing means in the form of a spring means adapted to fit within the bottom of the box and centrally thereof so as to be arranged within the central cavity of the inverted filters to support and to urge them upwardly and said flat bottom against the inside of the container lid, a pad of adhesive material affixed flush with the lid on its underside thereof, the adhesive pad having a sticky surface so that the top filter urged against it by means of the biasing means is lifted thereby when the lid is raised into an open position.

2. The invention of claim 1 and wherein the container if formed of paperboard.

3. The invention of claim 1 and wherein the biasing means is formed of paperboard.

4. The invention of claim 1 and wherein said spring biasing means is formed as a bellows spring means.

5. The invention of claim 1 and including locking means engaging the lid with the box during usage.

6. The invention of claim 1 and including means securing said spring means to the box bottom, said means including a base plate fitting in the bottom of the box and carrying the spring means thereon, for its location within the central cavity of the inverted filters and for use for biasing them upwardly against the underside of the container lid and its pad of adhesive material affixed flush therewith.

7. The invention of claim 6 wherein the spring means is in the form of resilient ears integral with the base plate, said ears being bent upwardly and towards each other to form biased leaf springs, and being interlocked together by inserting each ear into a slit formed in the other thereby forming a relatively flat, top surface upon which the supply of filter papers rest.

8. The invention of claim 7 wherein the flat leaf top has a sticky surface for adhering the filters thereto, and to prevent their removal, wherein the base plate is provided with a plurality of tabs, and wherein the box is provided with an equal number of slots adapted to receive the tabs to hold the spring means in place.

* * * * *